United States Patent [19]

Leterme et al.

[11] Patent Number: 4,542,492
[45] Date of Patent: Sep. 17, 1985

[54] OPTICAL HEAD IN A RECORDING AND READING DEVICE FOR A DATA CARRIER

[75] Inventors: Dominique Leterme; Jean-Pierre Le Mèrer, both of Paris, France

[73] Assignee: Thomson CSF, Paris, France

[21] Appl. No.: 468,684

[22] Filed: Feb. 22, 1983

[30] Foreign Application Priority Data

Mar. 9, 1982 [FR] France ................ 82 03936

[51] Int. Cl.$^4$ .............................. G11B 7/12
[52] U.S. Cl. ..................... 369/46; 369/112; 369/122
[58] Field of Search ........... 369/44, 45, 46, 122, 369/112, 121, 111; 250/201; 346/76 L, 108; 350/173

[56] References Cited

U.S. PATENT DOCUMENTS

| 4,065,786 | 12/1977 | Stewart | 369/121 |
| 4,203,652 | 5/1980 | Hanada | 350/182 |
| 4,333,173 | 1/1982 | Yonezawa et al. | 369/45 |
| 4,334,300 | 6/1982 | Arquie et al. | 369/122 |
| 4,358,200 | 11/1982 | Heemskerk et al. | 369/45 |
| 4,387,452 | 6/1983 | Bricot et al. | 369/45 |
| 4,482,803 | 11/1984 | Lacotte et al. | 369/45 |

FOREIGN PATENT DOCUMENTS

EP-33052   5/1981  European Pat. Off. .
3131212    4/1982  Fed. Rep. of Germany .
2459513    9/1981  France .

OTHER PUBLICATIONS

Elektronik, vol. 27, No. 15, Dec. 1978, Munich(DE), "1010 Bit auf Einer Platte Optisch Gespeichert", pp. 31-34.

Primary Examiner—Donald McElheny, Jr.
Attorney, Agent, or Firm—Cushman, Darby & Cushman

[57] ABSTRACT

The optical head in a data carrier recording-reading device comprises a semiconductor laser source. A lens makes it possible to focus the beam from this source. A polarization beam splitter makes it possible to deflect the beam reflected by this carrier towards a group of photodetectors. According to the invention the splitter is an isosceles prism, which serves as an anamorphotic-splitting means. A quarter-wave plate is bonded to one of the faces of the prism. A planoconvex lens can also be bonded to the other face of the prism upstream of the photodetector.

21 Claims, 6 Drawing Figures

OPTICAL HEAD IN A RECORDING AND READING DEVICE FOR A DATA CARRIER

BACKGROUND OF THE INVENTION

The invention relates to the field of optically recordable and readable data carrier disks, the data being recorded in the form of a perturbation of a radiation-sensitive coating, e.g. a thermosensitive coating.

An optical head can comprise a GaAs semiconductor laser, a lens for setting to infinity, one or two anamorphic prisms, a polarization splitting or separating cube, a quarter-wave plate, a focusing lens and a system of servomotors for the focusing on the disk and for following the track.

BRIEF SUMMARY OF THE INVENTION

The device according to the present invention makes it possible to obtain a simplified integrated optical head by means of an optical system called an anamorphic-splitting system. This optical head performs the functions of emitting a beam from a laser source and of receiving the beam reflected by optoelectrical detection means, whereby said two functions are completely separate. It comprises a reduced number of elements, so that the overall dimensions are small and few settings are required. Thus, compared with the prior art devices, the device according to the invention has the advantage of reducing the number of elements in the head, which reduces the number of carriers, the number of optical faces, the overall dimensions of the head and consequently its weight and price.

The present invention specifically relates to an optical head in a data carrier recording-reading device comprising at least one track, having a semiconductor laser source emitting a collimated beam, polarized in accordance with a given direction and illuminating via a reflecting mirror, the entrance pupil of a lens projecting an illumination spot of said carrier, and control means making it possible for the illumination spot to follow a track carried by the carrier, optical splitting or separating means positioned between the source and the reflecting mirror for returning to photodetector means the radiation collected by this lens and coming from the data carrier, a quarter-wave plate positioned between these splitting means and the data carrier, whereby this quarter-wave plate makes it possible to rotate the polarization of the light reflected by the disk by $\pi/2$ compared with that of the incident light, in which said splitting means are constituted by an anamorphic prism, whose entrance face for the radiation emitted by the laser source has undergone a polarization splitting treatment, which completely transmits the incident light from the laser source and which completely reflects the light reflected by the data carrier, whose polarization direction is orthogonal to that of the beam emitted by the laser source.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
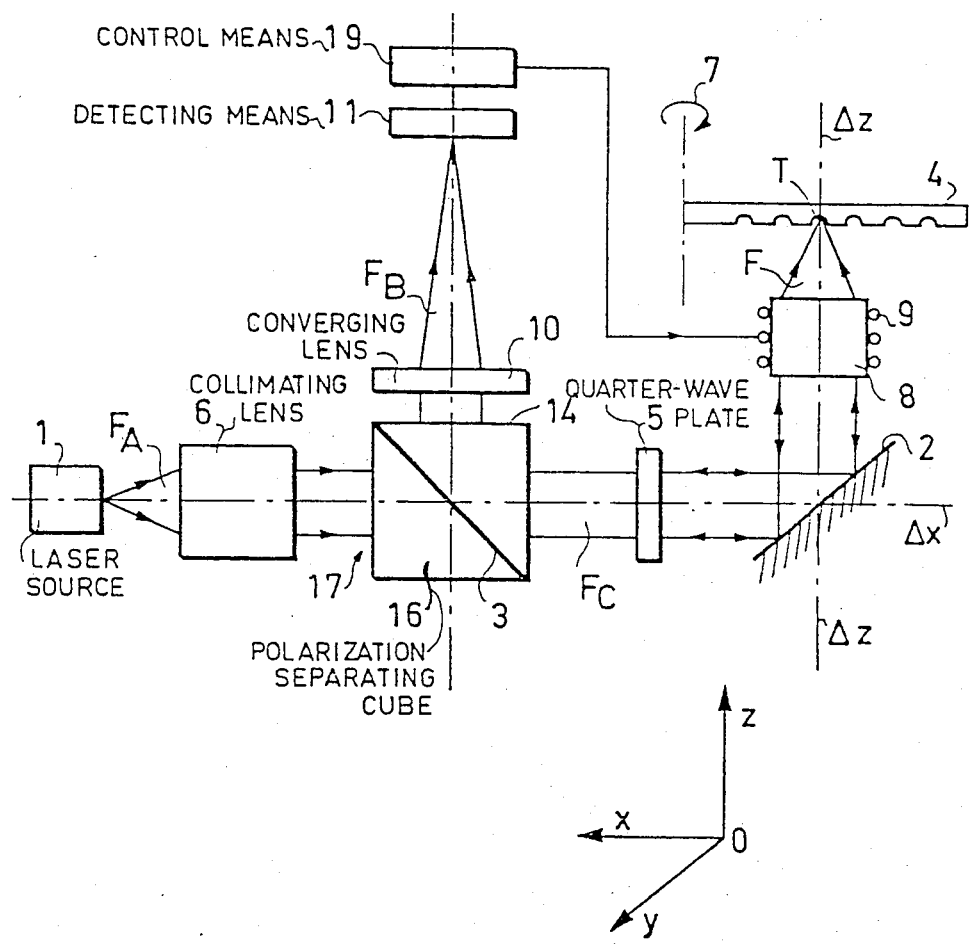
FIG. 1 a prior art device.

FIG. 1 shows a prior art device in which the semiconductor laser is linearly polarized according to the junction plane, which makes it possible to use a polarization beam splitter 16, which can be e.g. a cube constituted by two joined or bonded prisms. The separation or splitting surface 3 formed by the hypotenuse of the two cubes is treated in such a way that it has a polarization splitting or separating function. It transmits all the radiation having a given polarization and reflects all the radiation having a polarization 90° from the first-mentioned radiation.

Thus, in FIG. 1, the radiation $F_A$ from the laser source is integrally transmitted to disk 4. A lens 6, whose optical axis coincides with axis $\Delta_x$ is placed between laser 1 and the polarization beam splitter 16. On emerging the radiation is made roughly parallel, so that it totally reaches the face 17 of beam splitter 16. This lens is designed so as to have no spherical aberrations for the maximum openings of beam $F_A$, formed by laser 1.

The beam $F_C$ transmitted by the polarization splitter 16 then reaches the parallel quarter-wave plate 5, which is oriented at 45° relative to the polarization of the incident beam $F_C$. This quarter-wave plate makes it possible to bring about an optical decoupling. Thus, the radiation from source 1 and reflected by the surface of information carrier 4 will no longer have the same polarity and can therefore cause no interference.

Moreover, the linearly polarized incident wave leaves the quarter-wave plate 5 polarized in a circular manner and e.g. in the levorotatory direction. This wave is transmitted to the elements of the recording-reading head and is reflected by the disk. It is then returned to the quarter-wave plate 5, still polarized in a circular manner, but in the dextrorotaty direction. Thus, said wave is returned to beam splitter 16 after traversing the quarter-wave plate 5, polarized linearly, but at 90° from the original polarization. Thus, reflection takes place on face 3 on passing through beam splitter 16.

Thus, the beam reflected by the surface of disk 4 of FIG. 1 is separated from the beam emitted by laser 1 due to the quarter-wave plate 5 and the separating surface 3 of a polarization splitting cube 16. When beam F is perfectly focused on the disk, forming a quasi-punctiform spot T, after traversing the convergent lens 10 which can e.g. be a planoconvex lens, the return beam $F_B$ is focused at a point. During reading, the power of beam $F_B$, which can be detected in the vicinity of this point by detection means 11, is a function of the surface state of disk 4 at point T. The presence of an etched indentation indicates an absence or reduction of the reflecting power of disk 4. Conversely, in the unetched areas, the beam is totally reflected. Thus, the power of beam $F_B$ is modulated during the rotation of the disk and the radial advance of the head, with the timing of the modulation of the relief previously inscribed on the disk. Moreover, both during recording and during reading, it is desirable that the detection means 11 can detect focusing errors (point T is not precisely in the plane of the disk) expressed in the form of a displacement in z. The detection signals of these errors are then used via circuit 19 for controlling the position of lens 8. These detection means can also make it possible to detect radial tracking errors (point T is not on the etched track in the case of reading, or on the track which it is desired to make and generally materialized in the form of a pre-etched track in the case of recording), expressed in the form of a displacement on the radial axis of disk 4.

A galvanometer mirror 2 is positioned on the path of beam $F_C$ and its pivoting about an axis ensures the radial control. This reflecting or deviating mirror 2 is placed in front of lens 8, so as to deflect in accordance with axis $\Delta_z$, the beam $F_C$ received along axis $\Delta_x$. Lens 8 then focuses beam F on the data carrier disk 4, which performs a rotary movement symbolized by arrow 7.

However, the beam emitted by the semiconductor laser is elliptical. Thus, the light beam leaving the semiconductor laser can have a divergence of 30° in the direction perpendicular to the junction and 10° in the parallel plane, i.e. a factor of 3 between the two axes, said laser being linearly polarized in the direction of the junction.

Figure 2:
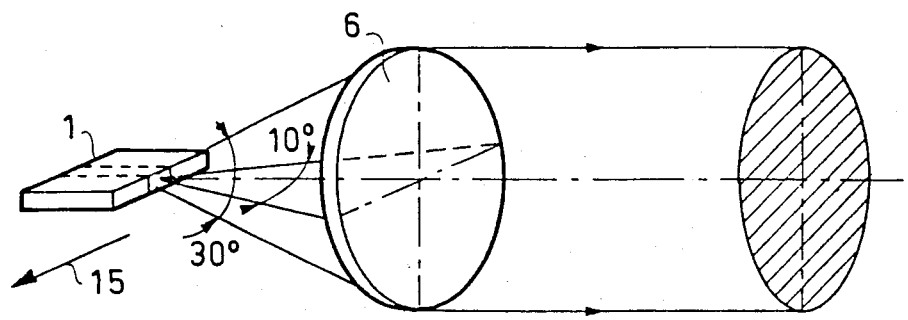
FIGS. 2 and 3 explanatory ray tracings.
Figure 3:
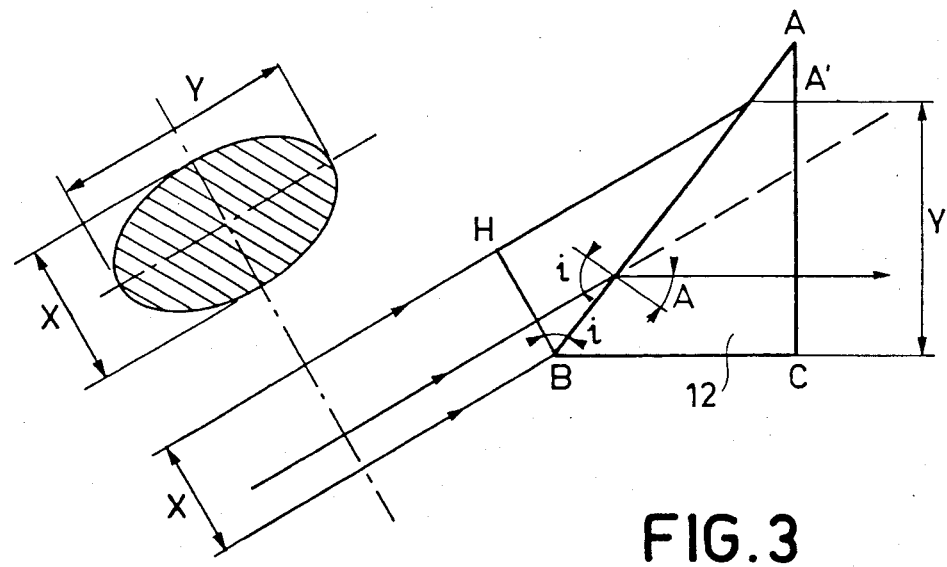

In FIG. 2, a semiconductor laser 1 associated with a sufficiently open lens 6 generates a light beam parallel to the elliptical section polarized in direction 15.

In order to have the maximum power and the smallest spot on the disk, it is necessary to make the beam circular. An anamorphic device then makes it possible to transform the beam, with an elliptical section, leaving the laser into a beam having a circular section.

The beam striking a diopter under certain conditions loses its ellipticity (major axis of the ellipse perpendicular to the plane of incidence). Thus, a beam having an elliptical section as shown in FIG. 1 striking a diopter 12 will lose its ellipticity in accordance with $$\frac{Y}{X} = \frac{\cos A}{\cos i}.$$

With A'C=Y and BH=X, we also have sin i=n sin A, and with n being the index of the material from which the diopter is made, i.e.

$$m = \frac{Y}{X}$$

$$\rightarrow m = \frac{\cos A}{\cos i} = \frac{\cos A}{\sqrt{1 - n^2 \sin^2 A}}$$

$$\rightarrow 1 - n^2 \sin^2 A = \frac{\cos^2 A}{m^2} = \frac{1}{m^2}(1 - \sin^2 A)$$

$$\rightarrow \sin A = \sqrt{\frac{1 - 1/m^2}{n^2 - 1/m^2}}$$

Figure 4:
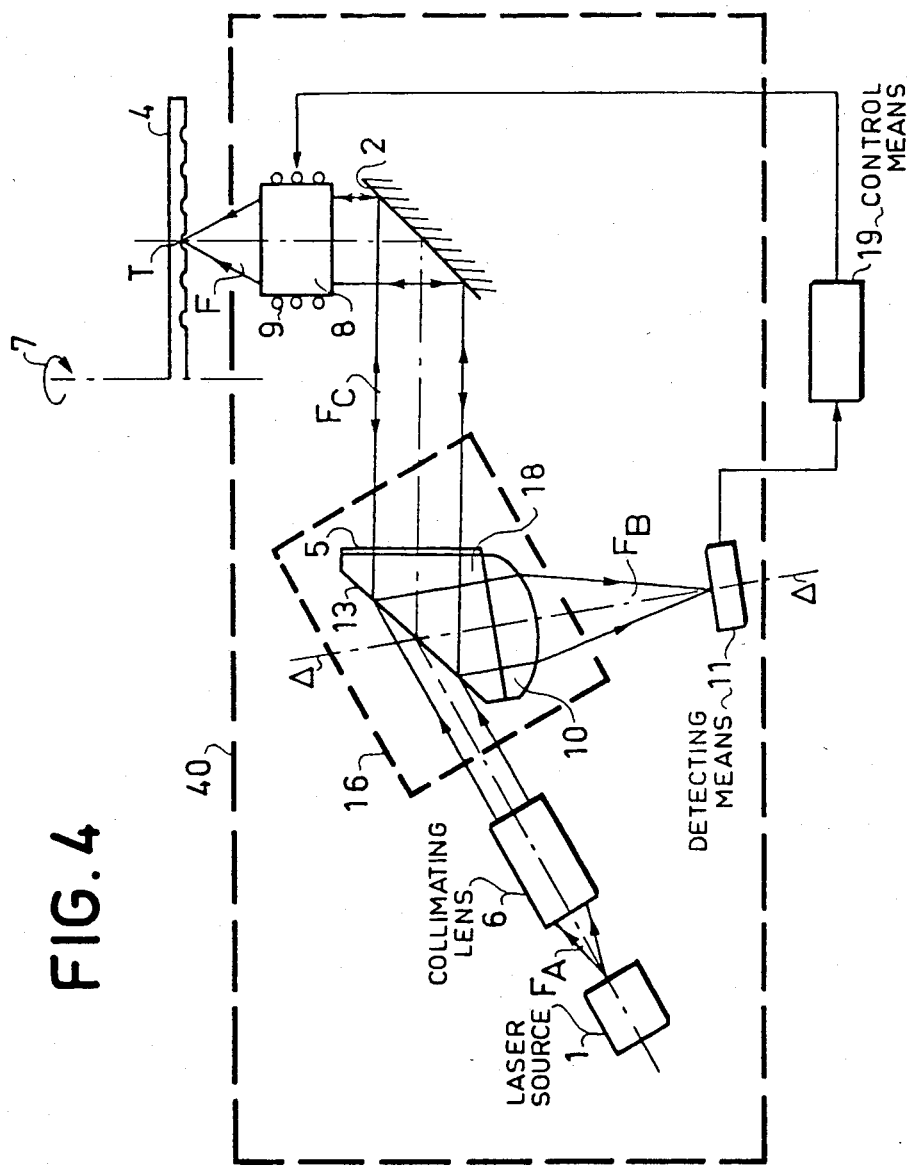
FIG. 4 an optical head according to the invention.

In the device according to the invention, the anamorphosis of the beam is obtained by inclining it relative to the normal of the entrance face of a prism 18, which is the base of an isosceles prism. This prism is shown in FIG. 4, which illustrates the device according to the invention. FIG. 4 shows the elements of FIG. 1 with the same reference numerals.

This prism also serves as a polarization beam splitter and for this reason its entrance face 13 has undergone a polarization splitting treatment, which completely transmits the incident light, whose polarization is oriented according to the minor axis of the ellipse and completely reflects the light polarized by 90°, which returns after reflection on the surface of disk 4.

Thus, prism 18 serves as an anamorphotic member. If m is the ellipticity of the beam (ratio of the major axis to the minor axis) the angle A of this isosceles prism 18 is chosen as:

$$\sin A = \sqrt{\frac{1 - 1/m^2}{n^2 - 1/m^2}}$$

in which n is the index of the prism and i the angle of incidence of the beam on said prism with sin i=n sin A to bring about the emergence of the beams at the sides of the isosceles prism, both during the outward and return path. For example, for m=2.56, we have in B an isosceles glass prism of index n=1.516 of angle A=39°9' and of incidence 72°23'.

The device according to the invention uses the main elements of the prior art device of FIG. 1. However, the polarization beam splitter is realized by an anamorphotic prism, whose entrance face has undergone a polarization splitting treatment and which has been described hereinbefore.

The quarter-wave plate 5, which makes it possible to rotate the polarization of the light reflected by the disk by 90° compared with that of the incident light, oriented in a square whose neutral lines are diagonal, has been bonded to one of the sides of prism 18.

Lens 10 can be in the form of a planoconvex lens which can be, for example, bonded to the other side 14 of prism 18, as shown in FIG. 4. This permits focusing on detection means 11.

Thus, according to the invention, it is possible to obtain an integrated head 40, i.e. whose elements are integral with the same carrier. This integrated optical head 40 comprises a GaAs semiconductor laser 1, a lens for setting to infinity 6, an anamorphotic-splitting system 16, a reflecting mirror 2 and a lens 8.

The system 16 according to the invention comprises an isosceles prism 18, an oriented and bonded quarter-wave plate 5 and optionally a bonded lens 10 for focusing the return beam.

The photodetector means 11 can be e.g. a two-quadrant cell. Thus, this cell performs three functions, so that by subtraction it is possible to obtain the focusing error signal (asymmetrical sensor), by summation the high frequency reading signal, and by sampling the track following error signals. However, it is possible to use any other type of sensor. For example this can be a four-quadrant cell.

Figure 5:
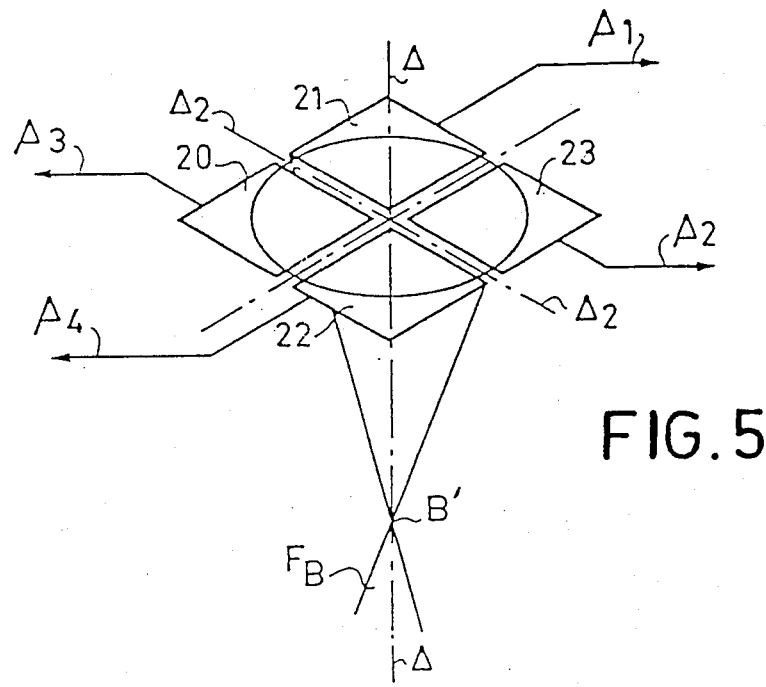
FIG. 5 a detail of an optical head according to the invention.

The photodetector means 11 then comprises four photodetectors arranged in accordance with the four quadrants in the manner shown in FIG. 5. These photodetectors are arranged perpendicularly to axis Δ. Lens 10 focuses the reflected beam on to the plane of these photodetectors in order to make it possible to detect the focusing errors (focusing point T is not precisely in the plane of the disk) expressed in the form of a displacement parallel to $\Delta_z$, as well as the radial tracking errors (the focusing point T is not on the etched track in the case of reading, or on the track which it is desired to make and generally materialized in the form of a pre-etched track in the case of recording), expressed in the form of a displacement in accordance with the radial axis of the disk. Finally, in the case of reading, these photodetector means are a function of the surface state of the disk at the convergence point T. The presence of an etched indentation implies an interruption or reduction in the reflecting power of disk 4. Conversely, in the unetched areas, the beam is totally reflected. Thus, the power of the reading beam reaching the photodetectors 5 is modulated during the rotation of the disk and the radial advance of the head, with the timing of the modulation of the relief previously inscribed on said disk.

An embodiment of these photodetectors is shown in FIG. 5. It makes it possible to obtain a radial tracking error signal, a focusing error signal and possibly a reading signal. The detection means comprise four photodetectors 20, 21, 22, 23 arranged in a plane perpendicular to the axis Δ.

The four photodetectors are arranged in a square around axis Δ, so as to be close as possible to one another and in such a way that in the absence of any focusing error, the power of beam $F_B$ is distributed in an equal manner in the four photodetectors and, with or without errors, the spot formed in the plane of the photodetectors by beam $F_B$ is entirely contained in their surface, in order that they detect almost all the power of beam $F_B$. Thus, the sum of the respective output signals of these four photodetectors $s_1$, $s_2$, $s_3$, $s_4$ indicates the presence or absence of an indentation on the disk at the location of the spot and consequently constitutes a reading signal. Beam $F_B$ is a stigmatic beam, which therefore converges at a point B'. The spot obtained in the plane of the photodetectors is circular and centered on axis Δ.

Figure 6:
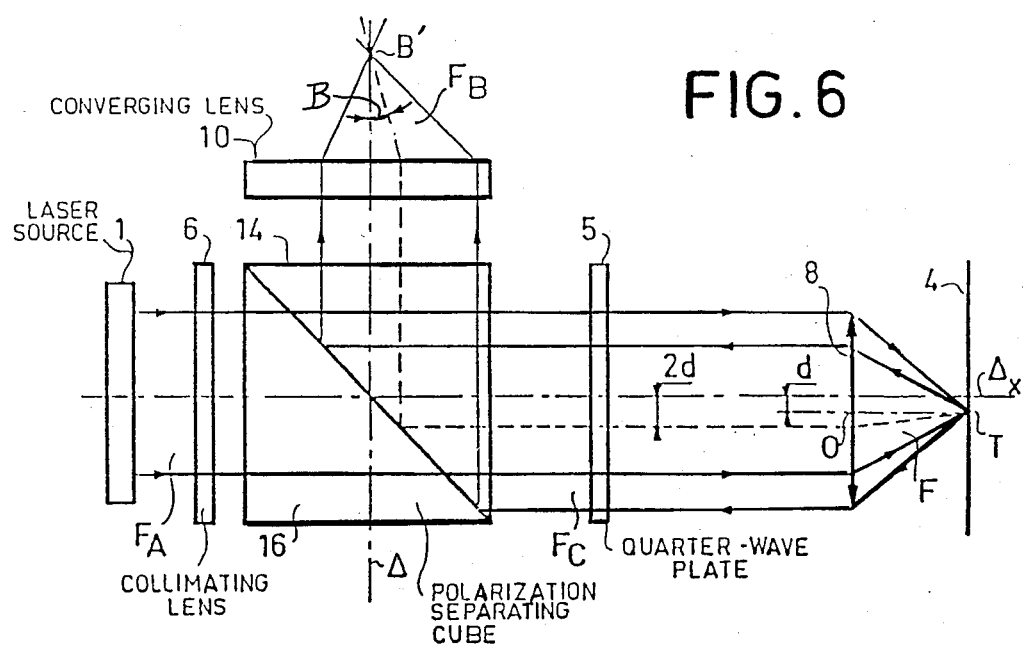
FIG. 6 explanatory drawing.

In the case of the prior art focusing error detection method, which is called the asymmetrical method (see FIG. 6) and is described in European Patent Application No. 0 029 755, a displacement d is produced between the axis of the optical device and axis $\Delta_x$, beam F being stigmatic. On considering the device described relative to FIG. 1, no reference being made to reflecting mirror 2 which serves no purpose here, the optical axis no longer passes through the optical center 0 of the lens 8 and the beam reflected by disk 4 no longer coincides with the incident beam. Even in the absence of a focusing error, the two beams are displaced by 2d. Thus, there is an angular displacement β after passing through lens 10. Beam $F_B$ converges at point B', but its axis forms an angle β with axis Δ. Defocusing then leads to a displacement of the light spot in a detection plane perpendicular to axis Δ and this can be detected by two photodetectors arranged so as to receive the same light energy fraction when the focusing error is zero.

In the case of a radial tracking error, when the focusing point on disk 4 is displaced with respect to the preetched track or the data carrying track, only part of the incident beam is reflected and the intensity is no longer equally distributed between the two photodetector arranged symmetrically relative to axis Δ. If it ensured that the displacement d produced between the optical axis and axis $\Delta_x$ corresponds to a displacement on the disk in a direction tangential to the recorded grooves, it is then necessary to have four photodetectors arranged in a square around axis Δ.

The integrated optical head according to the invention can be used in all recorders-readers and in all optical disk readers using an anamorphosis and a polarization splitting of a beam from a semiconductor laser.

What is claimed is:

1. A device for optically sensing data at a reference surface of a data carrier, said device comprising:
    a semi-conductor laser source emitting rectilinearly polarized optical energy;
    collimator means for gathering said optical energy and forming therefrom a bundle of parallel rays of predetermined cross section;
    polarization beam splitter means having a polarization splitting planar face receiving said bundle of parallel rays at oblique incidence from an external medium of low refractive index to which said polarization splitting planar face is exposed, whereby the portion of said bundle of parallel rays selectively transmitted by said planar face travels in a contiguous material of high refractive index for modifying the shape of said cross section;
    photodetector means arranged downstream of said planar face;
    optical means for causing said transmitted bundle of parallel rays to locally interact in said reference surface and for collecting from the area of interaction optical energy of crossed polarization, which being selectively reflected by said planar face is fed to said photodetector means for sensing said data.

2. A device as claimed in claim 1, wherein said bundle portion is transmitted under normal incidence through a further planar face of said material.

3. A device as claimed in claim 2, wherein said optical means comprise lens means for causing the optical energy emerging from said polarization beam splitting means to focus at said reference surface.

4. A device as claimed in claim 1, wherein an exit planar face of said material is provided for transmitting under normal incidence the portion of said optical energy reflected by said polarization splitting planar face.

5. A device as claimed in claim 4, wherein said optical means comprise lens means for causing the optical energy emerging from said polarization beam splitting means to focus at said reference surface.

6. A device as claimed in claim 4, wherein said polarization splitting planar face is oriented parallel to a bisector of said further planar face and said exit planar face.

7. A device as claimed in claim 6, wherein said optical means comprise lens means for causing the optical energy emerging from said polarization beam splitting means to focus at said reference surface.

8. A device as claimed in claim 6, wherein said faces build up a refracting triangular prism.

9. A device as claimed in claim 8, wherein said optical means comprise lens means for causing the optical energy emerging from said polarization beam splitting means to focus at said reference surface.

10. A device as claimed in claim 1, wherein said predetermined cross-section being non-circular in shape, said modified shape is made circular using the refractive correction taking place at said polarization splitting planar face.

11. A device as claimed in claim 10, wherein said optical means comprise lens means for causing the optical energy emerging from said polarization beam splitting means to focus at said reference surface.

12. A device as claimed in claim 1, wherein said optical means comprise lens means for causing the optical energy emerging from said polarization beam splitting means to focus at said reference surface.

13. A device as claimed in claim 12, wherein said optical means further comprise quarter wave means located between said polarization beam splitting means and said reference surface.

14. A device as claimed in claim 13, wherein said quarter wave means are affixed to said polarization beam splitting means.

15. A device as claimed in claim 12, wherein said photodetector means are arranged in a plane of focussing of the optical energy reflected from said polarization splitting planar face.

16. A device as claimed in claim 15, wherein said plane of focussing is the focal plane of a converging lens arranged downstream of said polarization splitting planar face.

17. A device as claimed in claim 16, wherein said converging lens is a plano convex lens having a planar face affixed to said polarization beam splitter means.

18. A device as claimed in claim 12, wherein the optical energy gathered by said lens means comes from a pivoting mirror arranged downstream of said polarization splitting planar face.

19. A device as claimed in claim 18, wherein said polarization beam splitter means comprises a block of refringent material having a set of three planar faces parallel to a common axis, one of said faces being said polarization splitting planar face and the two remaining faces being respectively provided with a quarter wave plate and a plano convex lens.

20. A device as claimed in claim 19, wherein said photodetector means comprise two adjacent cells.

21. A device as claimed in claim 20, wherein said photodetector means comprise four cells building up a four quadrant configuration.

* * * * *